United States Patent [19]
Reimer

[11] 3,810,516
[45] May 14, 1974

[54] VEHICLE WITH MULTIPLE ROCKING BEAM SUSPENSION SYSTEM AND STEERING MEANS

[76] Inventor: Walter E. Reimer, 16201 Ridgecrest, Monte Sereno, Calif. 95030

[22] Filed: Feb. 22, 1972

[21] Appl. No.: 228,014

[52] U.S. Cl............. 180/24, 180/24.01, 180/24.05, 280/104.5, 180/45, 172/276, 214/140
[51] Int. Cl.......................................... B62d 61/00
[58] Field of Search........ 180/21, 22, 23, 24, 24.05, 180/24.13, 24.11, 24.01; 280/104, 104.5

[56] References Cited
UNITED STATES PATENTS

| | | | |
|---|---|---|---|
| 3,313,555 | 4/1967 | Reimer | 280/104 |
| 1,629,079 | 5/1927 | Knox | 180/24.11 |
| 1,802,256 | 4/1931 | Hutt | 180/24.01 X |
| 3,154,164 | 10/1964 | Shaw et al. | 180/66 R X |
| 1,436,031 | 11/1922 | Furlong | 280/104.5 B |
| 3,471,166 | 10/1969 | Clark | 280/104.5 R |
| 3,099,098 | 7/1963 | Davis | 180/66 R |
| 3,509,721 | 5/1970 | Crawford | 180/66 R X |

Primary Examiner—Kenneth H. Betts
Assistant Examiner—John P. Silverstrim
Attorney, Agent, or Firm—Allen & Chromy

[57] ABSTRACT

A tractor-type vehicle equipped with a suspension system of the type disclosed in my prior U.S. Pat. No. 3,313,555, equipped so that the vehicle may be used as a bulldozer, scarifier, plow and the like, all of these operations being under the control of the one hydraulic ram. The improved suspension system of this vehicle is provided with primary rocking beams, one on each side thereof and a pair of secondary rocking beams attached to each of the primary rocking beams, the wheels of the vehicle being mounted on the secondary rocking beams whereby the vehicle may be used over rough terrain and still operate with stability, smooth action and improved traction. The wheel mountings are constructed so as to provide ample clearance for the wheels during steering and turning of the vehicle. The steering mechanism is constructed so that the vehicle can be turned in a relatively small area without placing undue wear on the tires of the vehicle.

7 Claims, 11 Drawing Figures

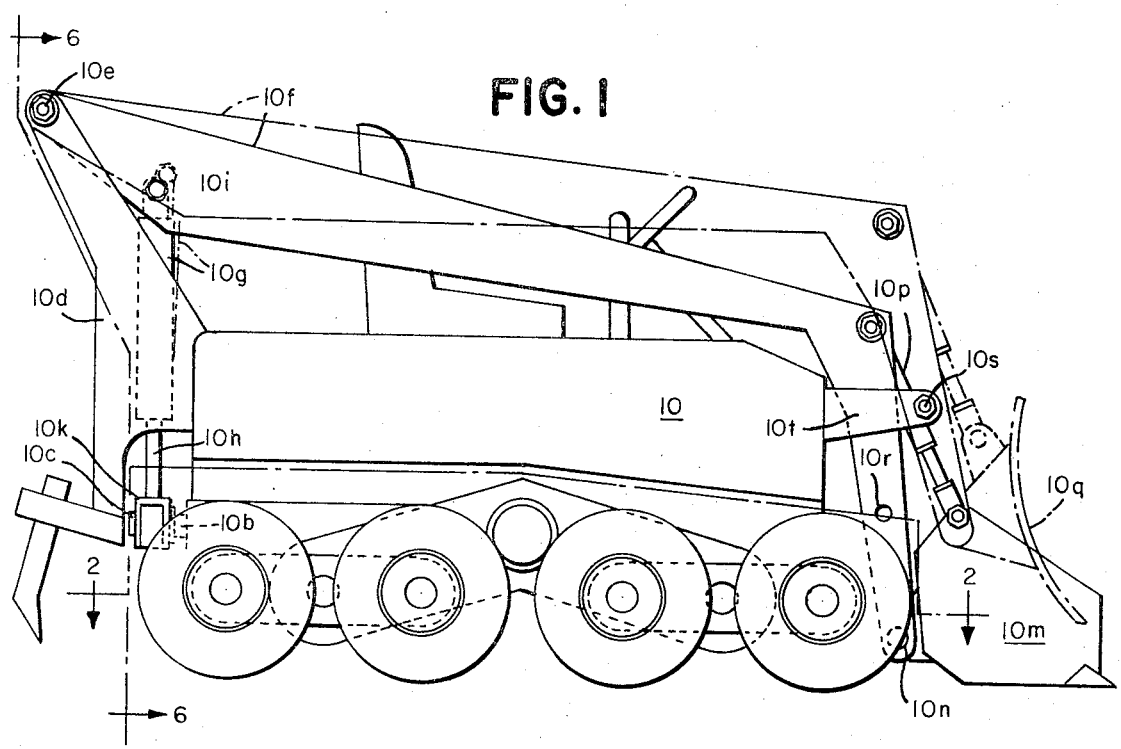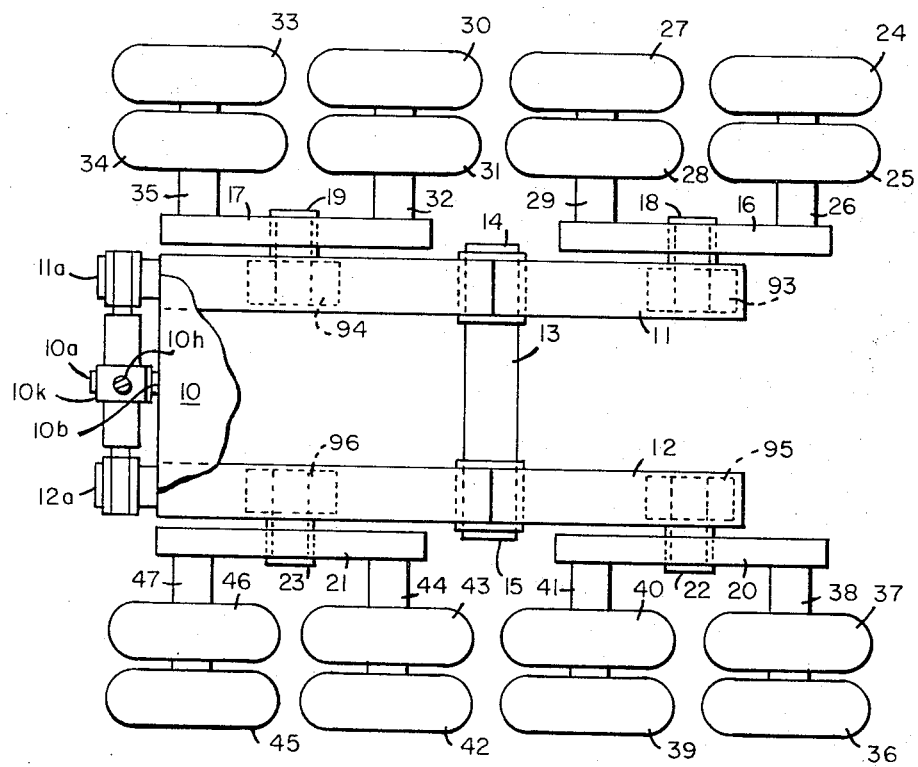

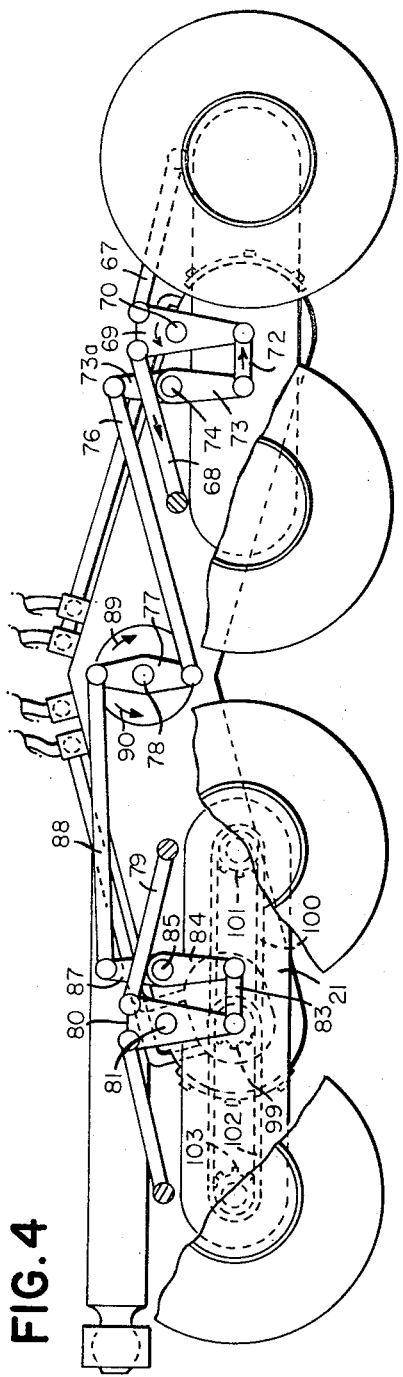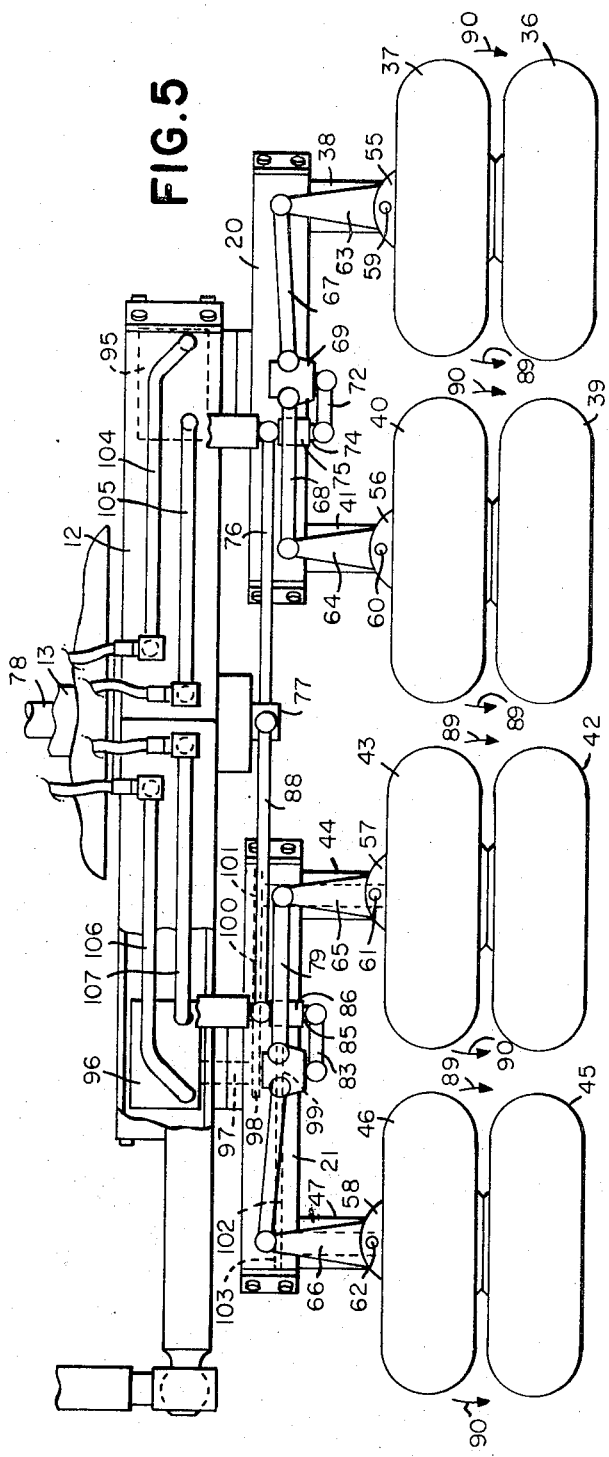

VEHICLE WITH MULTIPLE ROCKING BEAM SUSPENSION SYSTEM AND STEERING MEANS

DESCRIPTION OF THE INVENTION

This invention relates to tractor-type vehicles in general; more particularly, this invention relates to tractor-type vehicles provided with a suspension system such that the vehicle may be employed for diversified work and over relatively rough terrain.

An object of this invention is to provide an improved suspension system for vehicles such as tractors to provide smooth operation of the vehicle during various different operations thereof.

Another object of this invention is to provide an improved suspension system for vehicles such as tractors or the like, employing main rocking beams pivotally attached to the sides of the vehicle and auxiliary rocking beams pivotally attached to spaced points on each of the main rocking beams, the wheels of the vehicle being attached to the ends of the auxiliary rocking beams.

Another object of this invention is to provide an improved tractor-type vehicle which is provided with a loader shovel or a bulldozer blade on the front thereof and which is provided with a scarifier disk, plow or the like, on the rear thereof and which is provided with means whereby these different tools may be used selectively by the vehicle operator.

Still another object of this invention is to provide a tractor-type vehicle with an improved multiple wheel drive in which all of the wheels are pivotally mounted on the vehicle suspension and are turned during steering whereby smoother operation and easier handling of the vehicle is attained during steering thereof.

Other and further objects of this invention will be apparent to those skilled in the art to which it relates from the following specification, claims and drawing.

In accordance with this invention there is provided a tractor-type vehicle that is an improvement over the vehicle shown and claimed in my prior U.S. Pat. No. 3,313,555. In the present invention the suspension system disclosed in my prior patent is improved and adapted to a tractor-type vehicle which may be used or provided with a shovel loader or a bulldozer blade at the front thereof and a scarifier disk, plow, etc., on the rear thereof. Thus, the vehicle becomes much more versatile. In one embodiment of the present invention the compensating crossbar is connected to the left and the right main rocking beams by tie rods, and the cross bar is provided with a track located at the center of the vehicle so that the crossbar may move up and down in this track and be maintained centered and in proper alignment during certain operations of the vehicle in which the body of the vehicle may be tilted with respect to the vehicle suspension system.

The present invention is also provided with an arrangement whereby all of the vehicles wheels are adapted to turn during the steering of the vehicle. Thus, smooth and easy turning and steering of the vehicle is obtained in a relatively small area.

In order to provide a vehicle that may be used over relatively rough terrain I have constructed a suspension system employing a main rocking beam on each side of the vehicle pivotally attached to an axle running substantially through the center of the vehicle from one side to the other. The suspension system is also provided with four secondary rocking beams which are attached to the ends of the main rocking beams. Thus, there is provided a secondary rocking beam pivotally attached to each end of the main rocking beams. The wheels of the vehicle are mounted on the ends of the secondary rocking beams and these wheels are driven by hydraulic motors which are positioned in the hollow main rocking beams. The drive shafts of the hydraulic motors enter the secondary rocking beams through the axles thereof and these drive shafts are provided with sprockets located inside of the secondary rocking beams. Drive chains are provided between these sprockets and additional sprockets mounted on the individual wheel axles.

Further details and features of this invention will be apparent to those skilled in the art to which it relates from the following specification, claims and drawing, in which briefly:

FIG. 1 is a side view of a vehicle embodying features of this invention;

FIG. 2 is a sectional view taken along the line 2—2 of FIG. 1 showing the suspension system employed in this vehicle;

FIG. 4 is a side view partially broken away showing the vehicle drive and steering mechanism employed in accordance with this invention;

FIG. 5 is a plan view of a portion of the vehicle shown in FIG. 4;

Figure 3:
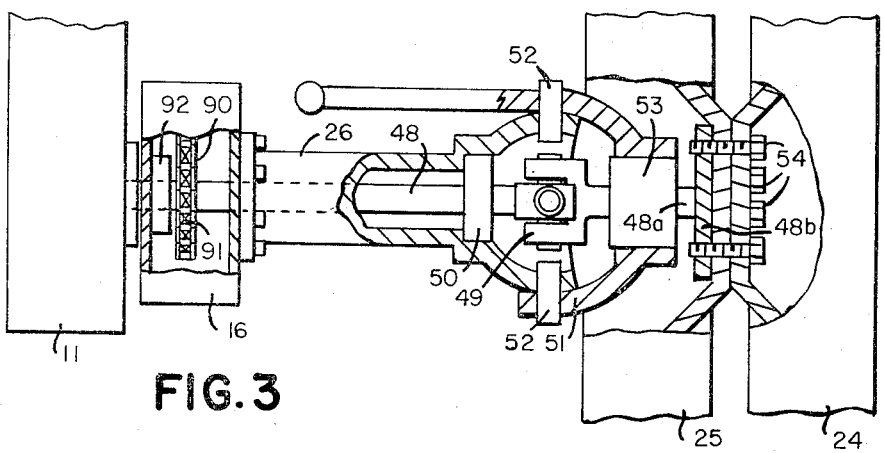
FIG. 3 is a fragmentary detail view partially in section showing the arrangement employed for mounting the vehicle wheels on the secondary rocking beams of the vehicle.
Figure 6:
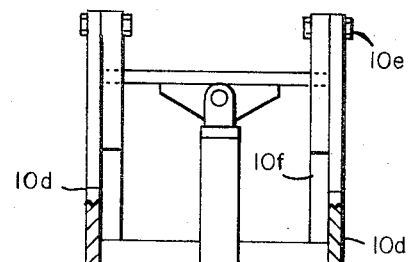
FIG. 6 is a sectional view taken along the line 6—6 of FIG. 1.
Figure 8:
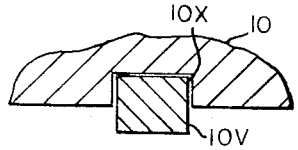
FIG. 8 is a sectional view taken along the line 8—8 of FIG. 7.

Referring to the drawing in detail reference numeral 10 designates the body of a tractor-type vehicle. This vehicle is provided with a suspension system employing two primary rocking beams 11 and 12, pivotally attached to end portions of the axle 13 which extends transversely across the central part of the body 10 and is attached to the lower part thereof. End portions 14 and 15 of the axle 13 form trunnions which function as bearings for the primary rocking beams 11 and 12, respectively. One side of the suspension system of the vehicle also includes secondary rocking beams 16 and 17, the mid-portions of which are pivotally attached to one of the primary rocking beams 11 by the bearings 18 and 19, respectively. The other side of the suspension system of the vehicle includes secondary rocking beams 20 and 21, the mid-portions of which are attached to the other of the primary rocking beams 12 by the bearings 22 and 23, respectively.

The vehicle shown in FIGS. 1 and 2 are provided with a crossbar 10a that is pivotally attached to the primary beams 11 and 12 by the joints 11a and 12a. This crossbar 10a is constructed similarly to the crossbar shown in my prior U.S. Pat. No. 3,313,555 and it is also provided with a pin 10b which extends into the body frame of the vehicle and is positioned in the sleeve 10c located in a hole through the central part of the crossbar. A drawbar is attached to the member 10d which is attached by welding or the like to the body of the vehicle. The lever 10f is attached to the top of member 10d by the pivot 10e and the hydraulic cylinder 10g is attached to the lever 10f by the pivot 10i. The piston rod 10h extending from the bottom end of the cylinder 10g is attached to the crossbar 10a by the U-shaped member 10k which embraces the sleeve 10c and crossbar 10a. The forward parts of the arm 10f may be provided with a shovel 10m which is pivotally attached thereto by pins such as the pin 10n. A hydraulic cylinder 10p is provided for moving shovel 10m on its pivot 10n. The shovel 10m may be employed to pick up and move a load of earth, rock, etc., and place this load on a truck, for example. When the operator desires to use the shovel he must insert the pin 10b into the frame of the vehicle body so that the crossbar 10a is attached to the vehicle frame and the U-shaped member 10k to which the bottom end of the piston rod 10h is attached, is fixed. When the pin 10b is inserted into the vehicle frame, the vehicle body cannot tilt on the axle 13. The operator then can employ the shovel 10m for loading dirt, rock, etc., simply by supplying hydraulic pressure to the cylinder 10g so that this cylinder functions to move the levers 10f and the shovel 10m attached thereto upward to dump the load carried by the shovel on a truck, for example.

When it is desired to use the vehicle as a bull-dozer the shovel 10m is removed and a bulldozer blade 10q is attached to the front of levers 10f as shown in broken outline in FIG. 1. The levers 10f are also raised so that pins such as pin 10 may be inserted into holes such as hole 10r shown in one of the levers 10f. The pins 10s are supported by the arms 10t which are attached to the front of the vehicle body. When the pins 10s are inserted into the holes 10r of the levers 10f the pin 10b at the rear of the vehicle is withdrawn from the vehicle frame so that the vehicle body and frame may tilt with respect to the vehicle suspension system around the axle 13 as an axis. The vehicle body and frame then may be tilted by supplying fluid pressure to the cylinder 10g and the bulldozer blade 10q caused to dig into the ground as desired. In the same manner the scarifier teeth attached to the member 10d at the rear of the vehicle may be caused to dig into the ground.

The pin 10b may be made of iron and may form the armature of a solenoid which is carried by the crossbar 10a and which may be energized by a suitable electric current to move the pin 10b either into engagement with the vehicle or withdraw it from the frame. A similar solenoid may be provided to each of the arms 10t for moving the pins 10s whereby these pins may be moved into or out of the holes 10r provided to the levers 10f.

Figure 7:
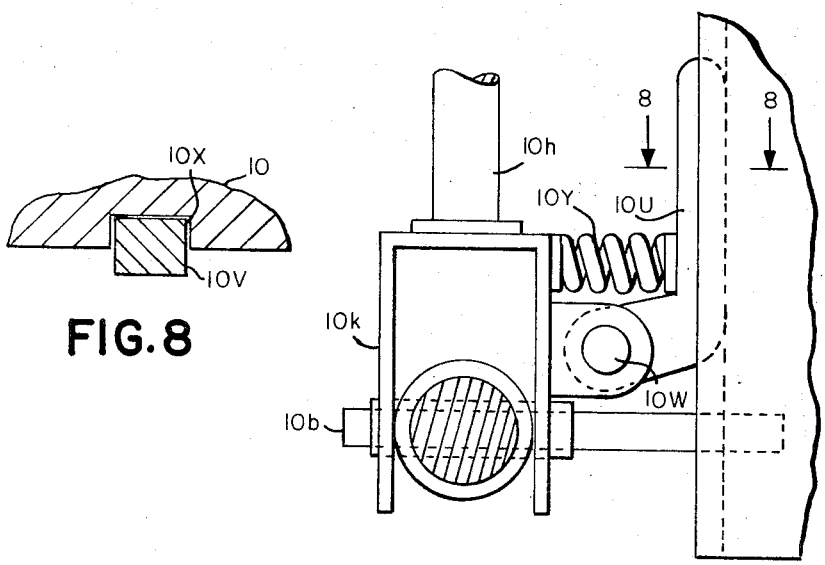
FIG. 7 is a sectional view taken along the line 7—7 of FIG. 6.

The U-shaped member 10k is provided with a bracket 10u as shown in FIG. 7 and the shoe 10v is pivotally supported on this bracket by the pin 10w. Thus, the shoe 10v rides in the groove or slot 10x provided in the rear of the body of the vehicle. A spring 10y is positioned between the U-shaped member and the shoe 10b to press this shoe into the slot 10x. The purpose of the shoe 10v is to provide means to keep the crossbar properly aligned when the pin 10b is withdrawn from the hole in the vehicle body, that is, when the vehicle is used as a bulldozer or scarifier as previously described.

Each of the secondary rocking beams 16, 17, 20 and 21 is provided with four wheels as shown in FIG. 2. Thus, wheels 24 and 25 are attached to the forward part of the rocking beam 16 by the member 26 and wheels 27 and 28 are attached to the rearward part of this rocking beam by the member 29. Wheels 30 and 31 are attached by member 32 to the forward part of rocking beam 17 and wheels 33 and 34 are attached to the rearward part of this rocking beam by member 35. Likewise on the other side of the vehicle wheels 36 and 37 are attached by member 38 to the forward part of rocking beam 20 and wheels 39 and 40 are attached by member 41 to the rearward part of this rocking beam. Also, wheels 42 and 43 are attached by member 44 to the forward part of rocking beam 21 and wheels 45 and 46 are attached to the rearward part of this rocking beam by member 47.

Members 26, 29, 32, 35, 38, 41, 44 and 47 are hollow and constructed as shown in FIG. 3. This view shows the forward part of rocking beam 16 and member 26 which is hollow is shown partially broken away to expose the drive shafts 48, and 48a and universal coupling 49 connected to wheels 24 and 25, to view. A bearing 50 is provided in the hollow member 26 for the drive shaft 48. The outer end portion of the hollow member 26 is enlarged to receive the universal coupling 49 which joins the drive shaft sections 48 and 48a. The enlarged portion of hollow member 26 also forms a bearing for the housing 51 which is pivotally attached to member 26 by the vertical pins 52. A bearing 53 is provided in the member 51 for the drive shaft section 48a. A flange 48b is attached to the outer end of drive shaft section 48a and the wheels 24 and 25 are attached to this flange by the bolts 54.

In FIGS. 4 and 5 there is shown an arrangement for steering and driving the multiple wheel tractor-type vehicle employing the suspension of this invention. Only one side of the vehicle is shown in these figures, and the same arrangement is provided to the other side of the vehicle. The vehicle suspension shown in FIGS. 4 and 5 employs primary and secondary rocking beams such as illustrated in FIGS. 1 and 2, and described in connection with these views. Thus, parts shown in FIGS. 1 and 2 are identified by the same reference numerals. The wheels 36 and 37 are attached to the secondary rocking beam 20 by the member 38 and the wheels 39 and 40 are attached to the rearward part of the rocking beam 20 by member 41. Likewise, the wheels 42 and 43 are attached to the forward part of the secondary rocking beam 21 by the member 44 and wheels 45 and 46 are attached to the rearward part of this rocking beam by member 47. The attaching members 38, 41, 44 and 47 are hollow members such as the member 26 shown in FIG. 3. In addition the wheels are provided with hollow housings such as the housing 51 shown in FIG. 3 which is pivotally attached by pins 52 to the outer ends of the hollow supports so that the wheels may be turned on these pivots to provide steering capability to all of the wheels of the vehicle. Thus, the wheels 36–37, 39–40, 42–43, and 45–46 are attached to stub shafts, such as stub shaft 48a shown in FIG. 3, which are positioned in bearings supported by housings 55, 56, 57 and 58, respectively. These housings correspond to the housing 51 shown in FIG. 3 and they are provided with pivot pins 59, 60, 61 and 62, respectively, 50 that the wheels may be turned by moving the steering levers 63, 64, 65 and 66 which are attached to these respective housings. Levers 63 and 64 are attached by swivel joints to the outer ends of the rods 67 and 68, respectively, and the adjacent ends of these rods are connected by swivel joints to the upper part of plate 69 which is supported by pivot pin 70 on bracket 71 that is attached to the beam 20. The lower end of the plate 69 is attached by swivel joint to one end of the rod 72 and the other end of this rod is attached by a swivel joint to the bottom of lever 73. The outer end of the pivot shaft 74 is attached to the top part of lever 73. A tubular member 75 which is attached to the beam 20 functions as the bearing for shaft 74. The inner end of shaft 74 is attached to the lower end of lever 73a and the upper end of the lever 73a is attached to one end of the rod 76 by a swivel joint. The other end of rod 76 is attached by a swivel joint to the bottom end of the rotatable lever 77 which is fixedly attached to the outer end of the steering shaft 78. Wheels 42–43 and 45–46 are provided with a similar steering arrangement. In this case the arm 65 which is attached to the housing 57 associated with wheels 42–43, is attached to one end of the rod 79 by a swivel joint and the other end of this rod is attached by a swivel joint to the plate 80 which is supported by pivot pin 81 on bracket 82 that is attached to the beam 21. The lower end of plate 80 is connected by a swivel joint to one end of rod 83 and the other end of this rod is connected by a swivel joint to the lower end of lever 84. The upper end of lever 84 is fixedly attached to the outer end of the bearing shaft 85 and the bearing 86 for this shaft is attached to the beam 21. The inner end of the bearing shaft 85 is fixedly attached to the lower end of lever 87. The upper end of lever 87 is attached by a swivel joint to one end of the rod 88 and the other end of this rod is attached by swivel joint to the rotatable lever 77. The steering shaft 78 is actuated by conventional bevel gears and steering column (not shown) which is provided with a steering wheel (also not shown). Thus, by rotating the steering wheel the shaft 78 is rotated and this in turn rotates the lever 77. By turning the lever 77 clockwise as indicated by the arrow 89 the wheels are all canted in the direction indicated by the arrows 89 positioned adjacent thereto and the vehicle is prepared to turn in a relatively small space. The steering mechanism provided to the wheels on the other side of the vehicle, which are not shown, will, of course, be canted by rotation of the shaft 78 so that these wheels also prepare the vehicle to turn in the same direction. When the shaft 78 turns the lever 77 in the counterclockwise direction indicated by the arrow 90 the wheels are canted in the direction indicated by the arrows 90 located adjacent thereto so that the vehicle is then turned to proceed in the opposite direction.

The primary rocking beams 11 and 12 and the secondary rocking beams 16, 17, 20 and 21 provided to the vehicle are all hollow to provide space for receiving the hydraulic drive mechanisms employed in this invention. Each of the members 26, 29, 32 and 38, 41, 44 and 47 are provided for attaching the wheel pairs 24,25, 27–28, 30–31, 33–34, 36–37, 39–40, 42–43 and 45–46, respectively, is constructed as shown in FIG. 3, and in each case the wheel pairs driven by drive shafts such as 48 and 48a shown in this figure which are provided with a sprocket 90 and chain 91. In each case a bearing such as 92 is provided inside of the hollow rocking beam such as the beam 16 shown in FIG. 3 for receiving the inner end of the drive shaft 48. The chain 91 extends from the sprocket 90 to a driven sprocket which is located substantially in the central part of the hollow beam and is supported by a shaft that extends from the beam 16 through the bearing thereof into the primary beam 11 in which there is positioned a hydraulic motor for driving this shaft. Four hydraulic motors 93, 94, 95 and 96 are positioned in the primary beams of the vehicle for driving the wheels thereof. Thus, the hydraulic motor 93 is provided for driving wheel pairs 24–25 and 27–28; hydraulic motor 94 is provided for driving wheel pairs 30–31 and 33–34; hydraulic motor 95 is provided for driving wheel pairs 36–37 and 39–40 while hydraulic motor 96 is provided for driving wheel pairs 42–43 and 45–46. The chain drive mechanisms associated with the hydraulic motor 96 provided for driving wheel pairs 42–43 and 45–46 are illustrated in detail in FIGS. 4 and 5. The drive mechanisms employed to drive the other wheels of the vehicle are the same as those illustrated in these two views.

The hydraulic motors 93, 94, 95 and 96 are of conventional construction and each comprises a pair of meshing gears, one of which is provided with an output shaft. The output shafts of the motors 95 and 96 extend from the rocking beam 12 through the axles or bearing members 22 and 23 which are used to pivotally attach the secondary rocking beams 20 and 21, respectively, to the main rocking beam 12. A similar arrangement is provided to hydraulic motors 93 and 94 and the output shaft thereof extend through the axle or bearing members 18 and 19 from the main rocking beam 11 into the secondary rocking beams 16 and 17, respectively. Thus, hydraulic motor 96 is provided with an output shaft 97 that extends into the secondary rocking beam 21 and is provided with sprockets 98 and 99 which are located inside of this secondary rocking beam. Sprocket 98 is provided with a chain 100 which extends between this sprocket and the sprocket 101 that is provided for driving reels 42 and 43. Sprocket 99 on the other hand is provided with a chain 102 which extends between this sprocket and sprocket 103 which is provided for driving wheels 45 and 46. Similar driving arrangements are provided between the other three motors 93, 94 and 95 and the other groups of wheels provided to the vehicle.

Motors 93, 94, 95 and 96 are driven by hydraulic pressure and for this purpose suitable tubing or plumbing is provided between these motors and a source of fluid under pressure. Two pipes are connected to each of the motors as shown in FIG. 5 and either one of these pipes may be used to supply fluid under pressure to the respective motor and the other pipe functions to return the fluid to the reservoir. Thus, if it is desired to drive the motors in one direction pressure is supplied through one pipe and return is provided in the other, whereas if it is desired to reverse the rotation of this motor then the pressure will be reversed and supplied through the normal return pipe whereas the normal pressure pipe will function as the return. Motor 95 is provided with pipes 104 and 105 and motor 96 is provided with pipes 106 and 107. Both of these groups of pipes are positioned inside of the primary rocking beam 12 and lead out of the beam adjacent to the axle to conventional controls (not shown) located adjacent to the vehicle operator's position. Similar arrangement is provided in the rocking beam 11 on the other side of the vehicle. It will be noted that all of the rocking beams are provided with end plates which are removable so that access to the insides of these hollow rocking beams may be gained by removing these end plates to facilitate installation and inspection of the mechanism inside of these beams.

Figure 9:
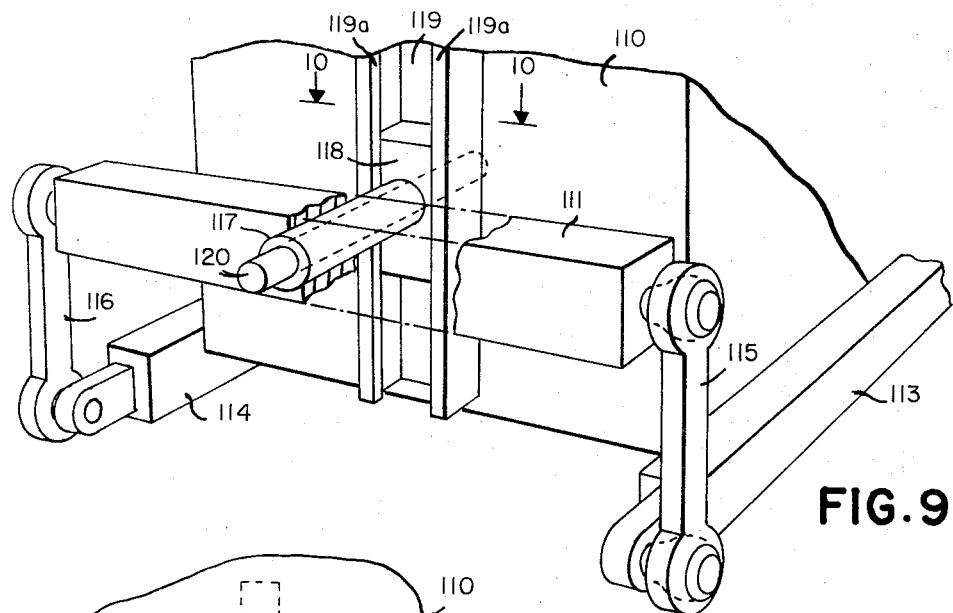
FIG. 9 is a partial view of another embodiment of this invention in which the crossbar is attached to the main rocking beams by short tie rods.

In FIG. 9 there is shown another embodiment of this invention in which the vehicle 110 is provided with a crossbar 111. Vehicle 110 is similar to vehicle 10 shown in FIGS. 1 and 2 and it is provided with main rocking beams 113 and 114 which are connected by suitable ball and socket joints to the lower ends of the tie rods 115 and 116, respectively. Additional ball and socket joints are provided between the upper ends of the tie rods 115 and 116 and the respective ends of the crossbar 111. The crossbar 111 is supplied with a sleeve 117 in the central part thereof and this sleeve extends into and is attached to the sliding block 118 which is slidable in the vertical channel track 119 attached to the body of the vehicle 110. A pin 120 is provided in the sleeve 117 and this pin extends all the way through this sleeve and through the sliding block 118 into a hole formed in the body of the vehicle 110 so that when it is desired to anchor the crossbar 111 at a fixed position determined by this hole the pin is inserted into this hole and the crossbar 111 is limited to pivotal motion around the axis of this pin.

Figure 10:
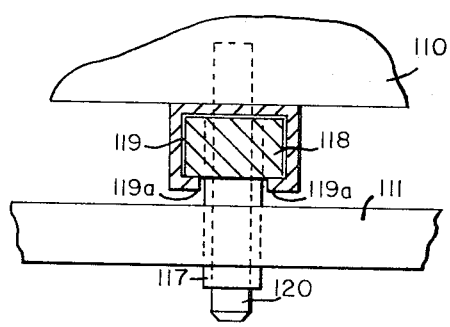
FIG. 10 is a sectional view taken along the line 10—10 of FIG. 9.

The channel 119 shown in FIGS. 9 and 10 is provided with lips 119a to confine the sliding block 118 in the channel while it is sliding up and down. Of course, the block 118 may be made of keystone cross sectional shape instead of the rectangular shape shown and the larger dimension of the block may be positioned to slide against the inside of the channel which in this case is of keystone cross sectional shape so as to confine the block therein during its up and down movement.

The tie rods 115 and 116 stabilize the operation of this embodiment of the invention during the rocking motion of the beams 113 and 114 and the tilting motion of the crossbar 111. Thus, it is important that the crossbar 111 be provided with guiding means such as the slide block 118 which is attached to the crossbar by the pin 120 and sleeve 117. Suitable set screw fastening means (not shown) may be provided to the bar 111 to prevent the sleeve 117 and pin 120 from accidentally sliding out of the bar 111 during operation of the vehicle.

Figure 11:
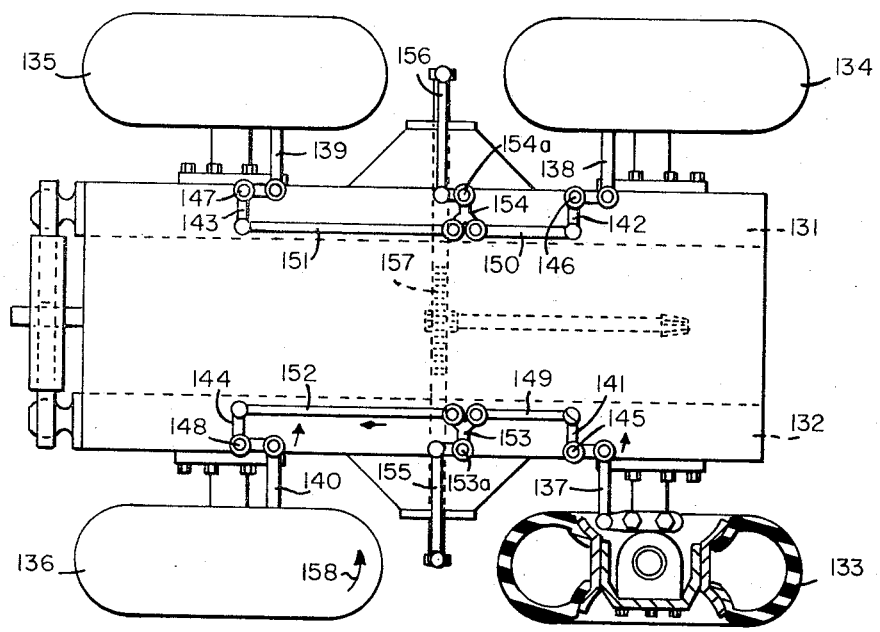
FIG. 11 is a plan view partially in section of another embodiment of this invention.

In FIG. 11 there is shown a four wheel vehicle 130 provided with main rocking beams 131 and 132 similar to the vehicle shown in my prior U.S. Pat. No. 3,313,555. Vehicle 130 is provided with a steering arrangement whereby all of the four wheels 133 to 136, inclusive, may be canted by the steering mechanism when it is desired to change the direction of motion of the vehicle. The wheels 133 to 136, inclusive, are attached to the vehicle main rocking beams by mounting means such as shown in FIG. 3 as described above and these wheels 133 to 136, inclusive, are provided with steering arms 137 to 140, inclusive, respectively. Steering arms 137, 138, 139 and 140 are connected by swivel joints to one of the arms of the bellcranks 141, 142, 143 and 144, respectively, which are pivotally attached to the main rocking beams by the pivots 145, 146, 147 and 148, respectively. The other arms of the bell-cranks 141, 142, 143 and 144 are connected by suitable swivel joints to the actuating rods 149, 150, 151 and 152, respectively. The adjacent ends of the rods 149 and 152 are connected by swivel joints to the bellcrank 153 which is pivotally mounted on the beam 132 by pivot 153a. The adjacent ends of the rods 150 and 151 are attached by suitable swivel joints to the bellcrank 154 which is pivotally mounted on the beam 131 by the pin 154a. The bellcranks 153 and 154 are connected respectively to the opposite ends of the rack and pinion arrangement 157 by the linkage arms 155 and 156, respectively. Thus, when the rack and pinion arrangement 157 is operated by the vehicle steering device (not shown) the various linkages described above function to cant the wheels to steer the vehicle in the desired direction.

While I have shown and described a preferred form of the invention, it will be understood that the invention is capable of variation and modification from the form shown so that the scope thereof should be limited only by the scope of the claims appended hereto.

What I claim is:

1. A vehicle such as a tractor adapted to travel over an earth surface, the combination comprising a body having a frame, main rocking beams positioned along sides of said frame, a plurality of wheels, means pivotally attaching said wheels to said beams, an axle extending transversely across the central part of said body frame near the bottom thereof forming pivots for said main rocking beams, a crossbar, means pivotally attaching the ends of said crossbar to ends of said rocking beams, stabilizing means attached substantially to the center of said crossbar, means attached to said body frame slidably receiving said stabilizing means for guiding said crossbar up and down during the tilting of said body frame on said rocking beams and adjustable means engaging said stabilizing means and said frame when it is desired to arrest up and down motion of said stabilizing means.

2. A vehicle such as a tractor adapted to travel over an earth surface, the combination as set forth in claim 1, further characterized in that the means pivotally attaching the ends of said crossbar to said main rocking beams comprises a pair of tie rods, one of said tie rods being pivotally connected between one end of said crossbar and one end of said main rocking beams and the other of said tie rods being pivotally connected between the other end of said crossbar and one end of the other of said main rocking beams, said vehicle body having a channel adjacent said crossbar, a slide block slidable in said channel and confined therein and means pivotally attaching said crossbar to said slide block.

3. A vehicle such as a tractor adapted to travel over a rough surface, the combination comprising a body having a frame, main rocking beams positioned along sides of said frame, an axle extending transversely across the central part of said body frame near the bottom thereof forming pivots for said main rocking beams, auxiliary rocking beams, means pivotally attaching selected ones of said auxiliary rocking beams to one of said main rocking beams, means pivotally attaching other selected ones of said auxiliary rocking beams to the other of said main rocking beams, a plurality of stub axles, means rotatably supporting selected ones of said stub axles on selected end portions of said auxiliary rocking beams, wheels attached to said stub axles by universal couplings, means for steering each of said wheels comprising bearing means for each of said wheels, means pivotally attaching selected ones of said bearing means to said selected end portions of said auxiliary rocking beams about a verticle steering axis, means driving said stub axles and said wheels, a crossbar, means pivotally attaching the ends of said crossbar to ends of said main rocking beams and stabilizing means attached to said body frame and substantially to the center of said crossbar.

4. A vehicle such as a tractor adapted to travel over a rough surface, the combination comprising a body having a frame, main rocking beams positioned along sides of said frame, an axle extending transversely across the central part of said body frame near the bottom thereof forming pivots for said main rocking beams, auxiliary rocking beams, means pivotally attaching separate ones of said auxiliary rocking beams to one of said main rocking beams on opposite sides of said axle, means attaching separate other ones of said auxiliary rocking beams to the other of said main rocking beams on opposite sides of said axle, wheels pivotally attached to end portions of said auxiliary rocking beams, a crossbar, means pivotally attaching the ends of said crossbar to ends of said main rocking beams and stabilizing means pivotally attached to said body frame and substantially to the center of said crossbar, said stabilizing means comprising a shoe slidable in a slot provided adjacent thereto in said frame and means pivotally attaching said shoe to said crossbar.

5. A vehicle such as a tractor adapted to travel over an earth surface, the combination as set forth in claim 3, further characterized in that said means driving said stub axles and said wheels comprises motors positioned inside of said main rocking beams.

6. A vehicle such as a tractor adapted to travel over an earth surface, the combination as set forth in claim 5, further characterized in that said means pivotally attaching said auxiliary rocking beams to said main rocking beams comprises short axles attached substantially to centers of said auxiliary rocking beams, and said motors having drive-shafts extending through said short axles into said auxiliary rocking beams, said driving means comprises chains and sprockets positioned in said auxiliary rocking beams, selected ones of said sprockets being attached to said motor drive shafts and other selected ones of said sprockets attached to said stub axles.

7. A vehicle such as a tractor adapted to travel over an earth surface, the combination comprising a body having a frame, multiple rocking beam systems positioned along opposite sides of said frame, each of said rocking beam systems including a main rocking beam and auxiliary rocking beams pivotally attached to said main rocking beams, an axle extending transversely across the central part of said body frame near the bottom thereof forming pivots for said main rocking beams, a crossbar, means pivotally attaching the ends of said crossbar to the corresponding ends of said main rocking beams, stabilizing means slidably supported on said frame, said stabilizing means being pivotally attached substantially to the center of said crossbar, and adjustable means preventing said stabilizing means from sliding on said frame, a plurality of wheels, means pivotally attaching selected ones of said wheels to ends of selected ones of said auxiliary rocking beams, said last mentioned means including vertically disposed pivot pins whereby said wheels may be turned to steer the vehicle, each of said wheels having a steering arm attached thereto and a steering linkage attached to all of said steering arms.

* * * * *